(12) United States Patent
Braun

(10) Patent No.: US 8,985,439 B2
(45) Date of Patent: Mar. 24, 2015

(54) METHOD OF MOBILE OPTICAL RECOGNITION

(71) Applicant: Deetectee Microsystems Inc., Victoria, CA (US)

(72) Inventor: Edwin Braun, Victoria (CA)

(73) Assignee: Deetectee Microsystems Inc., Victoria, British Columbia (CA)

( * ) Notice: Subject to any disclaimer, the term of this patent is extended or adjusted under 35 U.S.C. 154(b) by 0 days.

(21) Appl. No.: 14/157,723

(22) Filed: Jan. 17, 2014

(65) Prior Publication Data

US 2014/0203073 A1    Jul. 24, 2014

Related U.S. Application Data

(60) Provisional application No. 61/873,923, filed on Sep. 5, 2013, provisional application No. 61/754,041, filed on Jan. 18, 2013.

(51) Int. Cl.
*G06F 17/00*     (2006.01)
*G06K 7/10*      (2006.01)

(52) U.S. Cl.
CPC ........................................ *G06K 7/10* (2013.01)

USPC .......................................... 235/375; 235/385

(58) Field of Classification Search
CPC ......... G06F 7/08; G06Q 10/08; G06Q 10/087
USPC .................................................. 235/375, 385
See application file for complete search history.

(56) References Cited

U.S. PATENT DOCUMENTS

| 8,222,996 | B2 | 7/2012 | Smith et al. | |
|---|---|---|---|---|
| 2005/0063027 | A1* | 3/2005 | Durst et al. | 359/2 |
| 2007/0050468 | A1* | 3/2007 | Gazit | 709/217 |
| 2009/0127326 | A1* | 5/2009 | Rudeen | 235/375 |

* cited by examiner

*Primary Examiner* — Daniel St Cyr
(74) *Attorney, Agent, or Firm* — Davis & Bujold, PLLC; Michael J. Bujold

(57) ABSTRACT

A method of mobile optical recognition involves equipping authorized parties with a tag capable of generating a light spectrum signal. A step is taken of sending from a mobile device having a scanner a signal interrogating the tag. A further step is then taken of capturing with the scanner an image of a generated light spectrum signal generated by the tag in response to interrogation by the mobile device. A final step involves comparing the generated light spectrum signal with an anticipated light spectrum signal stored in a database to verify authenticity.

11 Claims, 5 Drawing Sheets

METHOD OF MOBILE OPTICAL RECOGNITION

CROSS REFERENCE TO RELATED APPLICATIONS

This application claims the benefit of U.S. Provisional Patent Application No. 61/754,041, filed 18 Jan. 2013 and U.S. Provisional Patent Application No. 61/873,923, filed 5 Sep. 2013.

FIELD

There is described a method of mobile optical recognition.

BACKGROUND

Methods of mobile optical recognition currently available focus upon biometric identification, be it face recognition, fingerprint or any combination of biometric features. The main issue with biometric detection is not only the technical challenges on mobile devices it is also about protecting the user's identity and privacy. What is required is a different approach to mobile optical recognition.

U.S. Pat. No. 8,222,996 (Smith et al) entitled "Radio frequency identification tags adapted for localization and state indication" describes some expanded uses for radio frequency identification (RFID) in a context of physically locating objects within a warehouse.

SUMMARY

There is provided, a method of mobile optical recognition which involves equipping authorized parties with a tag capable of generating a light spectrum signal. A step is taken of sending from a mobile device having a scanner a signal interrogating the tag. A further step is then taken of capturing with the scanner an image of a generated light spectrum signal generated by the tag in response to interrogation by the mobile device. A final step involves comparing the generated light spectrum signal with an anticipated light spectrum signal stored in a database to verify authenticity.

In order to differentiate the light spectrum signal from other light, it is preferred that the step of capturing with the scanner an image involves capturing in close temporal relation a first image taken immediately prior to the light spectrum signal and then a second image with the generated light spectrum signal. A further step is then taken of using differential imaging between the first image and the second image to differentiate the generated light spectrum signal from other light.

The underlying concept is that of detecting a wearable device and not the person directly. This provides more flexibility to protect the users' privacy. The approach of detecting a device rather than the person directly transfers all of the control to the user wearing this device. It is up to the user to decide if he wants to be detected or scanned in a certain situation. The user is always in control and knows when he is scanned or detected. Our system actually mimics the real world scenario off a key to a car or house. To be more precise, our system could be easily compared to a credit card or ID where the user has the responsibility to keep it safe and also the user needs to have an initial identification process to acquire the card.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A method of mobile optical recognition, will now be described with reference to FIG. 1 through FIG. 5.

Figure 5:
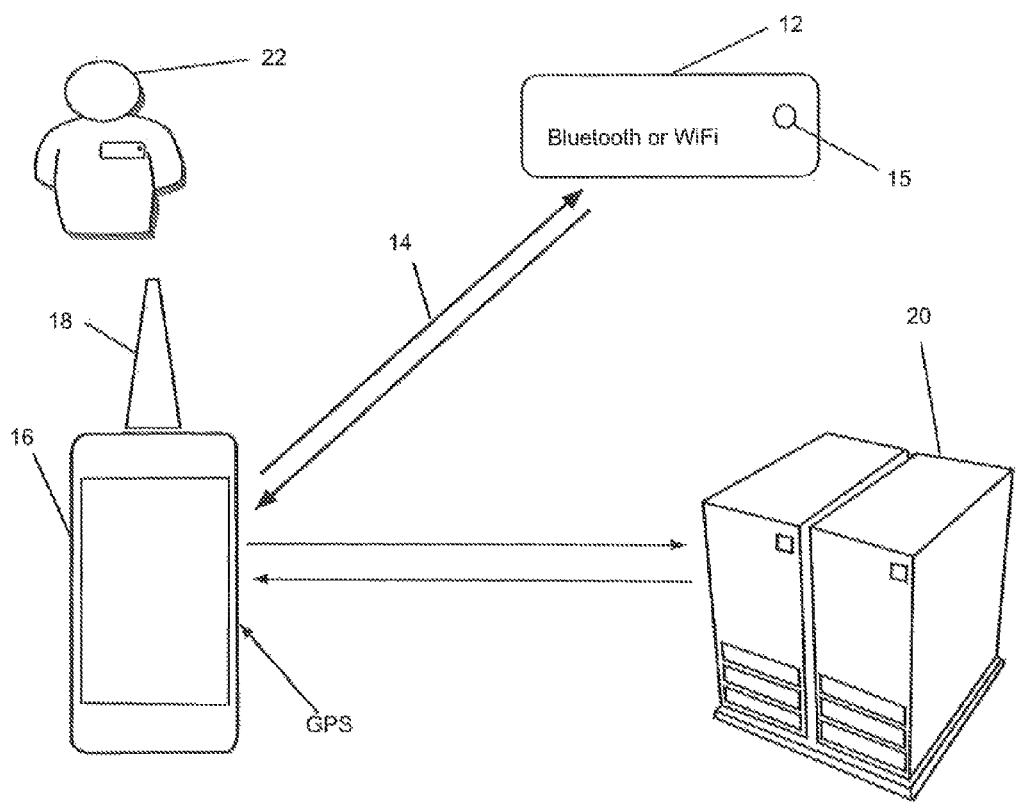
FIG. 5 is a schematic diagram showing the relationship between system components.

Structure and Relationship of Parts:

Referring to FIG. 5, the method of mobile optical recognition involves equipping authorized parties with a signalling device (a single burst optical recognition tag, referred to herein as a SBOR-TAG or TAG) SBOR-TAG 12 using bluetooth technology has been illustrated) capable of generating a light spectrum signal 14. A step is taken of sending from a mobile device 16 having a scanner 18 (a global positioning system (GPS) enabled cellular telephone having a camera has been illustrated) a signal interrogating SBOR-TAG 12. A further step is then taken of capturing with scanner 18 an image of a generated light spectrum signal 14 generated by an LED 15 on SBOR-TAG 12 in response to interrogation by mobile device 16. A final step involves comparing the generated light spectrum signal with an anticipated light spectrum signal stored in a database 20 to verify authenticity. It is envisaged that SBOR-TAG 12 is worn on a person, who is then considered a "tagged" person 22. It is preferred that light spectrum signal 14 is a single burst or blink of light.

Figure 1:
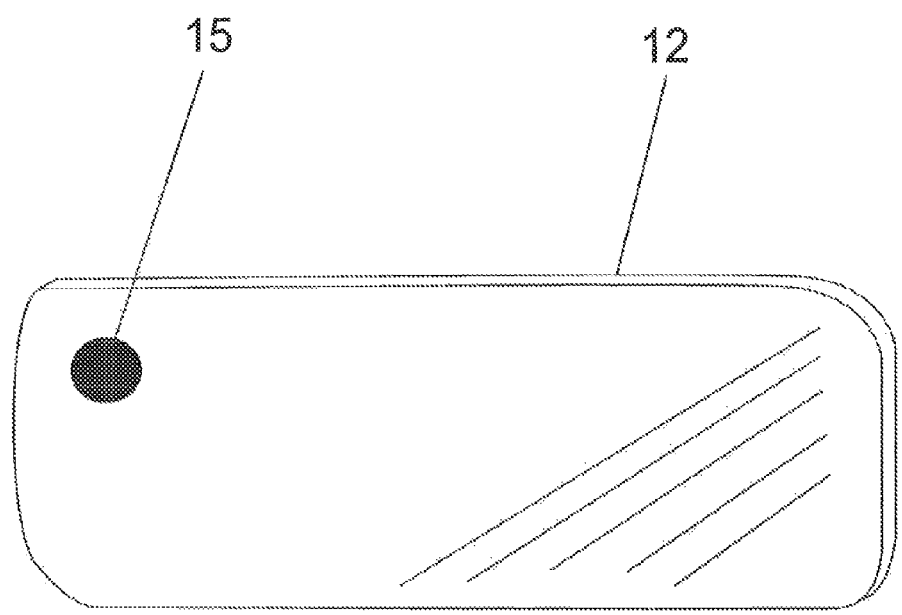
FIG. 1 is an image capture of a TAG in an "of" mode.
Figure 2:
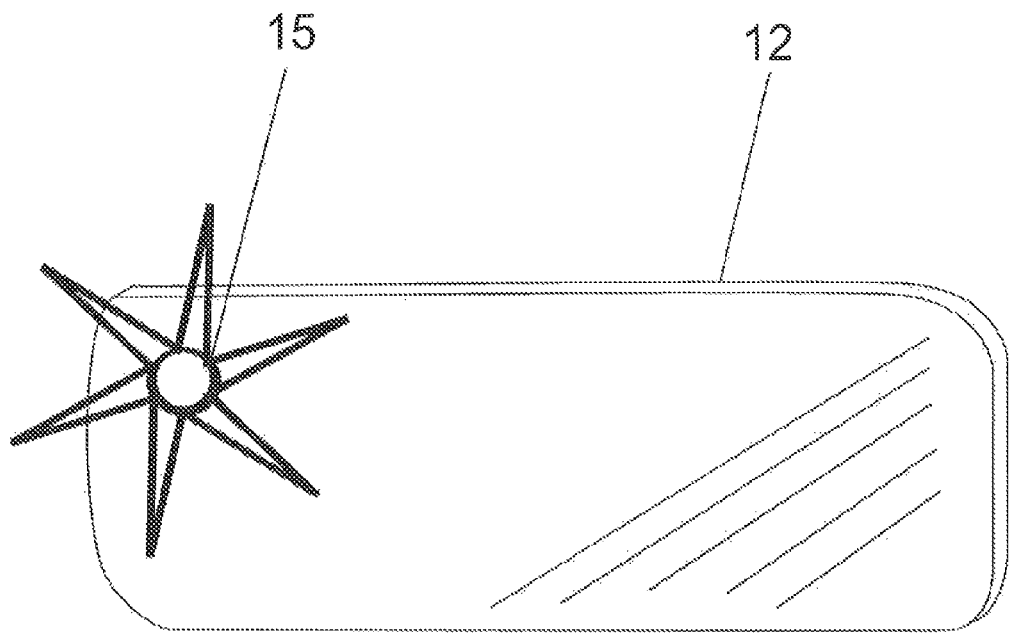
FIG. 2 is an image capture of a TAG in an "on" mode.
Figure 3:
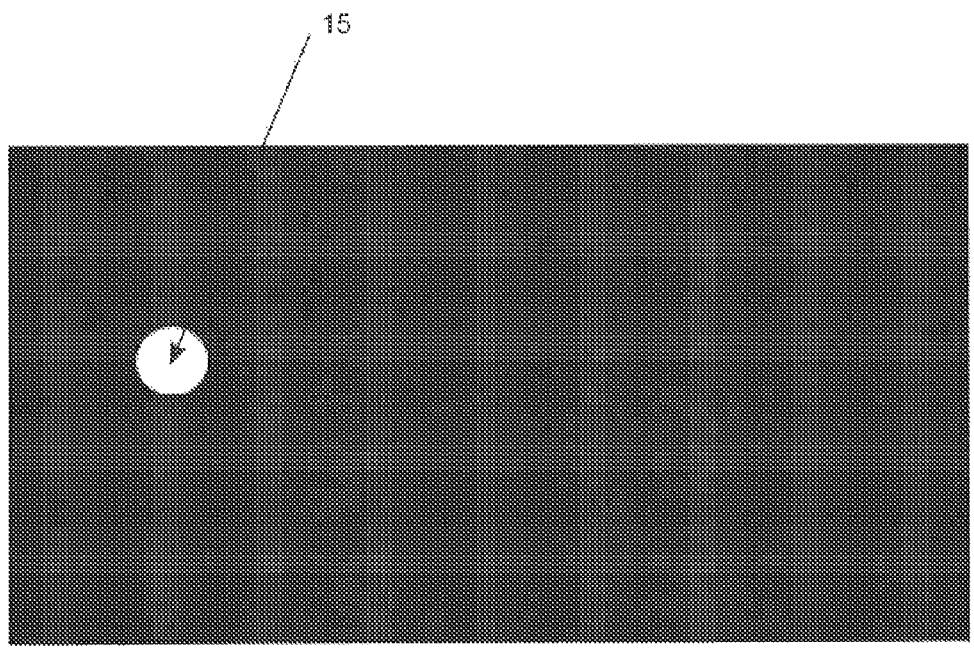
FIG. 3 is a processed differential Image data (with Image 1 subtracted from Image 2 with threshold processing).

Referring to FIG. 1 through 3, in order to differentiate the light spectrum signal from other light, it is preferred that the step of capturing with the scanner an image involves capturing in close temporal relation a first image (see FIG. 1) taken immediate prior to the light spectrum signal and then a second image with the generated light spectrum signal (see FIG. 2). A further step is then taken of using differential imaging between the first image and the second image to differentiate the generated light spectrum signal from other light (see FIG. 3).

Figure 4:
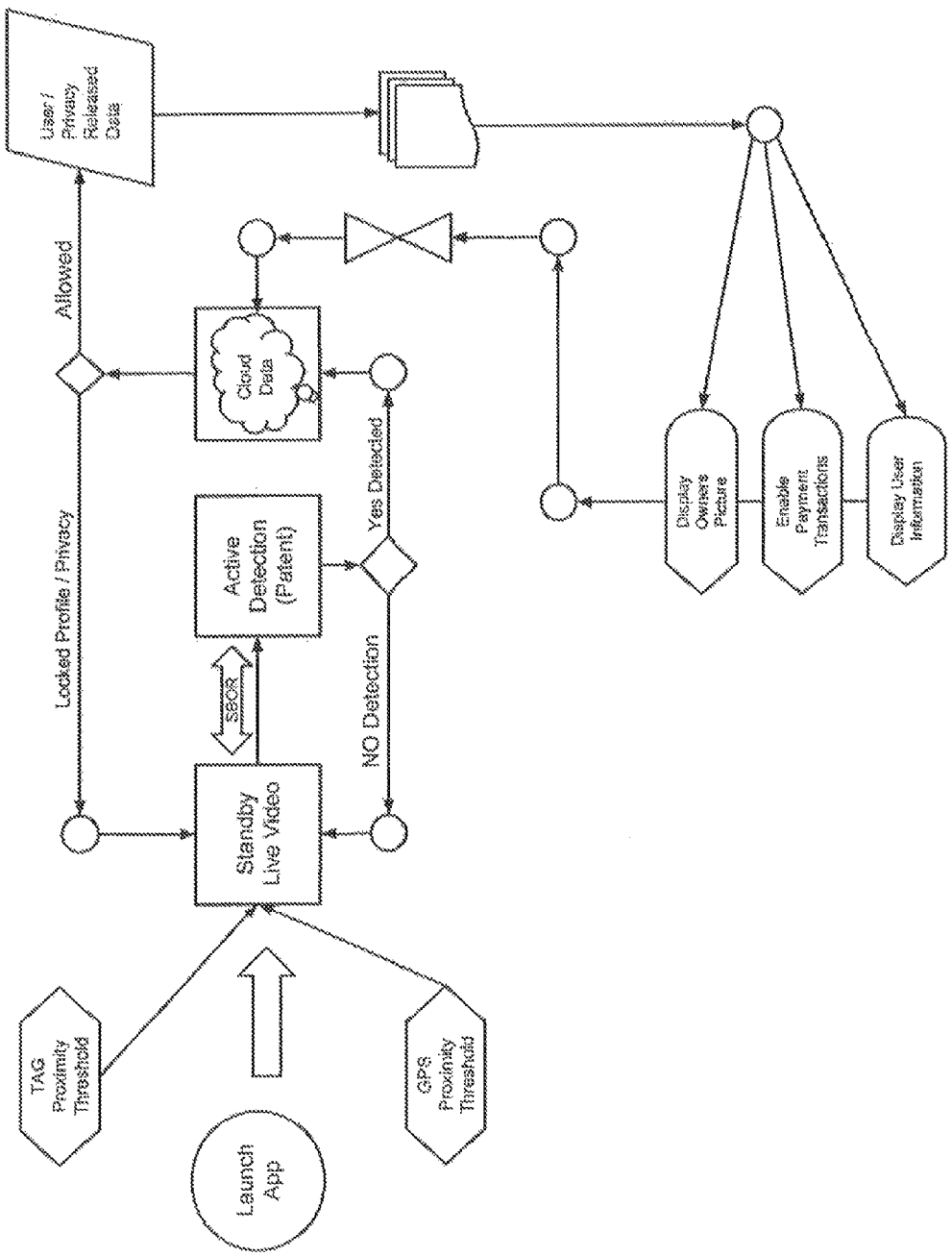
FIG. 4 is a flow diagram of the scanning process.

Referring to FIG. 4, a flow diagram of the scanning process is illustrated.

This approach provides a number of advantages. There is secure detection of objects and people in low light or no light scenarios. It is a non-pattern based detection method with low processing power. Optical recognition, detects objects or people exactly—even when standing close to each other or in relative proximity.

This method enables detection of objects or people from a distance through a mobile device equipped with a camera and one or many separate device(s) that can be attached to an object or person. This is done by using a multistep process that consists of a device ("TAG") and a camera equipped mobile device ("Scanner"). The mobile device e.g. smartphone is connected to a cloud based service that will transmit its position (GPS) to a central storage for proximity processing when multiple mobile devices are in close range. This information can be used to exclude or identify devices from a search.

The TAG is an active or passive device that is able to transmit or receive data to and from a mobile device e.g. a smartphone. This TAG will allow/enable the Optical Recognition initiated by a mobile device e.g. a smartphone. Every TAG comes with a unique identifier that is either transmitted or visually detected and deciphered. In this case the tag is an electronic Bluetooth device that transmits a unique identifier that can be detected by a mobile device e.g. smartphone when it is in close proximity.

A program, running on the mobile device checks constantly back on a centralized database (server) through an internet connection or by other means if a detected TAG is known to the system and ready for scanning.

Pattern-Less Single "Light Burst" Optical Detection

If a TAG (eg. a Bluetooth device) is recognized to be a valid and active TAG, the mobile device sends out a sequence of commands to force the TAG to identify itself. This is done by initiating a visual feedback from the TAG that can be detected with the camera of the mobile device. This visual feedback can be either a visible flash of light or any detectable wave lengths the CCD of the camera can record (e.g. Infra-Red) but not necessarily visible to the human eye.

Our proposed Mobile Optical Recognition will use a differential image capture algorithm coupled to a very well defined timing event. The mobile device sends out a command to the TAG based on its unique identifier to initiate a visual event that can be seen or recorded by a camera device. This visual light burst will appear for a short amount of time (e.g. 1/30th of a second) and two images will be captured—one image before the light burst—and one after. The Difference of those 2 images along with their close temporal relation will allow for a robust and simple detection of a light burst event through simple and fast optical pattern detection algorithms (brightest spot, area in an image). Noise and Stray light might cause false readings and in such a case this will re-initiate the detection process until successful. In case of multiple detections in one scan, another light burst is asked for within a very short time frame.

This technology offers key advantages to any other optical recognition method; instead of detecting patterns or object shapes or any other form of content related structures or colours within an image—our technology allows for optical recognition without the use of complicated pattern detection algorithms or excessive automated pattern learning tasks. The combination of temporal coherence between asking for an optical event (light burst) and creating image snapshots in the shortest amount of time between an off and on event reduces the processing load by a magnitude that would be normally involved when doing standard optical pattern recognition. By taking 2 Images (one off and one on) within 1/30 or shorter time frame the task of detecting the actual incident is extremely straightforward and can be done with the least amount of processing power on any mobile device.

Automatic Switch to Pattern Based Optical Detection

One variation of the method to detect an object is based on the exact same principle as described before, however instead of creating a single LIGHT BURST the TAG responses with a change of an optical pattern (visual) that can be recognized by the camera and software. This could be achieved by using OLED area lights (e.g. Phillips) see: http://www.lighting.philips.com/main/lightcommunity/trends/oled/ or by using Smart Film technology see here: http://en.wikipedia.org/wiki/Smart_glass—a visual pattern will identify the tag. Once the TAG is in proximity and is "scanned" it will reveal a specific pattern for a 30th of a second or shorter. When the TAG is not active (On) it will not show a pattern or change.

The same advantage of the combination of temporal coherence between asking for an optical event (show pattern) and creating 2 images (one before and after) applies here. The advantage would be that this system will work in bright light environments. The task of detecting the pattern and decoding the ID would be less processing intensive as well.

Description of the Pre Identification Process:

Before we can identify a person or individual wearing our technology, we have to create a link between a person and an identifying object. This registration process is similar to getting a bank card or an ID. It is important to follow a certain procedure to ensure the security and protection of the user's privacy. A user will be handed the wearable device only when he identifies himself. At the point of transfer (when the user gets his device) we lock the unique identifier of core technology/device to a single user. Similar to getting a passport or credit card, this wearable device represents a huge value to the user/owner. Like a SIN or SSN number, the unique identifier incorporated into our device is meant to represents the individual. Whenever this device is detected it has the potential to unlock many services for the user/owner that might involve a transfer of money to pay for service or to enter a certain area within a building or operate a device.

Description of the User Database:

As soon as the device is registered to an individual, the user has many options available to him. At any time the user/owner of a wearable device can access their online user profile that is connected to this unique identifier in his device. The user/owner will have full control over his privacy settings or information he wants to reveal when a scanning is initiated. Never, will it be possible for our system to reveal information that was not put in by the user himself. Like we described it in the pre-identification process, the user has full control over their privacy by deciding to wear the technology or not. The same is true with their online profile, whatever the user/owner wants to reveal is up to the individual. It is common for example to connect multiple services with personal profiles (e.g. Facebook page, Twitter account, Google+ . . . ) the user will be offered such possible linking to other services from within our system.

The database representing the user's profile, will be expandable and flexible to store a multitude of data in various forms. A profile picture, URLs, PDF papers, video clips, 3D data and many more other file formats or information can be stored in a user's profile. The user's profile could be seen as a collection of his achievements and personal identity. The data base will offer protected sections as well. This protected information could be a credit card numbers, passport numbers or any other confidential information the user might want to share in specific situations only.

Discussion of Potential Applications for the Technology:

Point of Sale Scenario

In a point of sale scenario, a user might walk into a coffee shop and the owner of the shop scans the device that incorporates our technology and identifies the user. The user gets a coffee and the store owner receives his payment automatically based on the detection of the user. In such a scenario the user/owner of the device needs to authorize the payment/method for the shop owner. This authorization of specific shops or stores can be done right from within the online users database/profile. For example the user/owner of the wearable device could select a store or shop and assign it to a specific payment method (credit card). Automatic authorization could also be based on GPS position data—so when the user enters the store the payment method is automatically set and when the user's device is scanned the payment process is already put in place. Here, again the user decides how the data is transmitted when their device is scanned. Any entity scanning for our technology or wearable device will only receive or acquire the data the user has authorized.

User Profiles

The least amount of data in a user profile would be the name of the user and in an encrypted field of the database his full address and password to access his profile online. A profile picture will also be mandatory and this will be or can be used for secondary security checks. Additional fields are optional and additional data can be added any time. The user profile and database can be filled and maintained by the user as described above. However, third party developers will also be able to add their own fields and information to this database. In an enterprise scenario, for example, an admin will be able to create user profiles and add custom data to it which will only be relevant for this enterprise and cannot be read by anyone else. This additional data can be encrypted as well. Adding new fields and data can be either done manually through a web interface or programmatically through an SDK/API we deliver.

Description of the Identification Process:

Every wearable device that incorporates our single burst optical recognition technology is detectable or can be identified or scanned by any mobile device that can run an application and has a built in camera. One example of such a mobile device is a smart-phone, by downloading a simple application (software program) every user of such a device will be able to scan for our technology and identify the person wearing it. Our wearable device can come in different embodiments, it could be integrated into another smart phone or it could be a standalone wearable devices—a name-tag for example. The detection; if a user is wearing our technology is a two step process. The first step is a simple proximity detection test, any wireless data transmission technology can be used to achieve this first step. We're using Bluetooth close range networking technology. If our device is in close range to our scanning device (smart-phone) we are able to identify this device based on its unique identifier (a unique identification number made out of numbers and characters). For our prototype application, we chose the Bluetooth standard because most smartphones do support it natively. However, I would like to stress that any wireless radio technology could be used to scan for our devices in proximity. If the first step has been successfully performed, we are able to identify the owner of this device by looking up the unique ID of the device in a database (online, Internet cloud)—this will give us the registered owner of this device.

Privacy Settings

While the user/owner has always full control of privacy settings to control what information is revealed in a scanning process, the user cannot change the unique identifier that was registered to him. The unique identifier is locked to one individual in an initial process that is described in the chapter above. Once more, we want to stress that our system is all about giving full control to the user to protect their privacy. Through the Internet, the user/owner of the wearable device can adjust his settings any time. All of his individual data like bank details, home address, payment methods, credit card information and other information will be encrypted within the database we supply to the user. The user/owner may also at any time remove or suspend his device from scanning or detecting by anyone. Our system also offers an automatic privacy mode. This automatic privacy mode works either based on proximity or time of day adjustments. The user/owner of our device may choose to change their privacy settings based on the area or location is or will be in. Geo positioning or detection of the user's position is done through their smart phone, the GPS position is transmitted to our servers if the user chooses so. One example of such a position aware privacy setting would be a favourite bar or pub the user frequently visits. So whenever the user enters the bar or pub the privacy settings for detection of his device made automatically change to "Private" that might allow someone else, who is scanning his device, to acquire private information (e.g. his Facebook page). In contrast to his private mode, his privacy setting might change automatically to "Business" when the owner enters their office at work. In business mode the user might only reveal is "Linked In" page and profile. In any case, our database will be flexible enough to cover an unlimited amount of automatic or semi-automatic privacy settings. The second method to adjust automatic privacy settings will be based on the time of day. The user might adjust his privacy settings between 8:00 PM and 1:00 AM or 7:00 AM to 4:00 PM. Based on individual time windows the privacy settings can be adjusted by the user and will be automatically applied at that time.

Continuation of Identification Process

After the first step has been performed, the scanning application/software is able to tell that a device with a unique identifier is close by (wireless range) and this tells us who it is as well. In the second step we use optical recognition (the built-in camera) to actually see if the device is in front of the mobile scanning device. The optical recognition is done by sending a signal to the wearable device to identify itself through a single optical event. This method is called "single burst optical recognition". Based on the signal strength, which is available through Bluetooth as well, we can tell which device is closer to the scanning device. The wearable device closest to our scanning device will be a requested to "blink" and only this device will blink/answer. This serialized scanning of the environment for closest wearable devices ensures that only one device will answer at our request which makes it easier for optical recognition. The scanning device (e.g. a smartphone) will use its camera to continuously scan for a "blink" or any kind of optical event. The software to detect the single optical burst event can be created in a very efficient way by using simple differential image processing. One image will be taken before the command to create an optical event is sent and another image will be taken after the SBOR (single burst optical recognition) command has been sent. By comparing those two pictures, it is easy to detect if the wearable device is visible in the camera or not. This, on the other hand gives us a clear indication of who is standing in front of the camera of the scanning device.

Assuming that only the registered user is wearing this device we can identify automatically the person itself and all related privacy settings he might have set in his profile. Like a credit card or his wallet we expect the user/owner of the wearable device to protect his property. In most cases, the above-mentioned assumption is enough for everyday use of our technology. Users will be detected easily without any issues or problems. However, should there be a need for enhanced security as secondary check can be easily added to the overall process. A strengthened and secondary check could look like this: after the wearable device is detected and it is assumed it belongs to a certain individual the profile picture of the user/owner can be pulled from the database via Internet and this profile picture can be easily matched against the picture just taken when scanning the wearable device. This part of facial recognition can be done through known methods and technologies based on image processing functions. In a time critical environment we would send the scanned picture to our server to do the facial recognition offline instead of doing image processing calculations on the mobile device which might not have enough processing power.

In addition to the aforementioned two step process, the active part of the detection process (single burst optical recognition) could be initiated for an individual when the individual faces the camera of the scanning person only. The orientation of the individual wearing our technology and the one scanning could be determined by existing gyro/compass technology that could be part of our wearable technology.

Description of Restricting Device Access:

Our technology could be used to restrict access to a mobile device or any kind of device. The key for access control is always identifying the authorized individual that has access to that device. For example, a smartphone might only be usable when the user is identified through our single burst optical recognition method. To enable a smartphone the user has to hold it in a certain way so that the camera can see the wearable device to identify the user. If the user is identified and authorized the mobile device can be operated.

Another example would be a desktop PC where the user sits in front of a web-cam connected to this PC. The login process would be automated through a specialized software that mimics the aforementioned detection process and allows access to the PC based on the wearable devices that is detected. In any case, the detection process we'll use a special SDK/API that will send a command to our Internet server to check who the user is of this wearable device that has been detected. The communication with our servers will be done in a secure way. In the case of a mobile device (smartphone, tablet) the proximity measures done through Bluetooth might also automatically trigger a lockdown of the device when the signal strength (distance) between the wearable device and the mobile device (smartphone) is below or above a certain threshold.

Building Access Scenario

Another usage scenario would be controlling access to a certain area within a building. For example, a door to a laboratory could be locked for a certain group of people within a company or organization. Only authorized personnel will be allowed to pass through a door. Authorization of such personnel will be done through our single burst optical recognition. The wearable devices will only be assigned to a specific individual and within our database the access rights of that individual would be managed. To allow such scenarios our Internet server will allow third party developers to add their own fields/information into the database. In such an enterprise scenario, a key person or admin will be enabled to manage the user profiles. Individual users will not be able to adjust database fields that have not been authorized by the assigned admin.

Conference Delegate Scenario:

Single burst optical recognition can be used to identify individuals visiting a conference or taking part in an exhibition. Conferences or conventions are all about meeting people and bringing together individuals to exchange new ideas and present new technologies. Accessing conferences or taking part in talks this usually done through a dedicated registration process. An accessed pass permits the user to take part in the conference offerings. Single burst optical recognition eases this process. The user can be identified right at the door of a talk or speech and with the identification of the individual— the access rights to the various offerings of the conference can be automatically unlocked or restricted. With our technology a much more fine tuned access rights system could be offered. Conventions usually avoid complex access rights for their visitors. It is hard to maintain or check. Usually it would involve a lot of personnel and it also slow down access to the conference rooms. With the single burst optical recognition, users would be allowed access to a conference room based on their individual profile. Thanks to the secure of the individual, fraud or unauthorized attendance in a talk or presentation could be easily detected and proven to the individual which might trigger an extra charge. Because of its touchless and automated recognition of individuals a simple system could be installed at the door or entrance of conference room that can detect if an individual user attended the talk or presentation. For the first time—a pay per use principle could be applied to conventions and conferences. A simple threshold based on time could define if a user has to pay for a talk he attends. If a user stays longer than 5 minutes or if the user enters the room and leaves after the talk is done he could be charged automatically for this event. Fraud would be easily detectable as with single burst optical recognition the detection process itself creates automatically prove of the individual by taking a picture. A user could not argue that he did not attend the talk or presentation. Single burst optical recognition offers many advantages over classic paper printed badges. Our detection technology can be re-used for multiple conferences or exhibitions and it can also be used for non-conferencing scenarios. The user might be able to pay for his snack or lunch at the convention. A user might well use SBOR to connect with other users at the conference eliminating the need to exchange business cards. Anyone could scan any one at the show and exchange any data the user has authorized. Exhibitors will have new methods two measure their success at conventions and exhibitions. Thanks to the detection of individuals in front of the camera the exhibitor could measure the amount of interest and repeating visits to his booth. And exhibitor could also automate the collection of leads, if a user is standing longer than 2 minutes in front of the boot and watching a presentation the individual's data could be automatically added to a database. In addition to the collection of user information the exhibitor code creates pro-active sales measures. If a customer comes by a second or third time he could automatically offer a special deal to the individual by sending directly data to this mobile device. The touchless detection method from a distance offered by single burst optical recognition allows the exhibitor to collect data upfront before the customer approaches the booth. This will allow the presentation personal to adjust their presentations to the specific needs of the individual. The organizer of the exhibition or conference will also benefit a lot from single burst optical recognition. Registration has to be performed only once. If a user already owns a wearable device, with our technology integrated, he does not have to re-register again. The unique ID and device belongs to the user and is attached to the user's ID. And annual conference would just re-use the device and the stored user profile. The end-user on the other hand would be able to use their device for other conferences that use the same system or for other services like mobile payments.

Tracking Scenario

Single burst optical recognition can be used in environments where it is necessary or needed to track the movement of people or individuals. In contrast to passive detection technologies like QR codes or any other form of printed identification, our method still works in total darkness or critical light situations. One possible scenario would be to track individuals in a theme park. Small children or people in need could be equipped with our wearable technology and by using existing surveillance cameras it would be possible to track individuals and their position in the park. If a child gets lost it could be even tracked down to the seat in the ride that happens in total darkness. To do this the optical recognition a reasonably powerful PC connected to the surveillance camera system would be enough. An existing network of Wi-Fi hotspots could be used to activate our single optical recognition technology in the wearable device. The PC; processing the request to find an individual on feeds off the surveillance cameras would then look for the single optical burst within the captured video frames. The same method could be used in large malls to track individuals throughout the mall. By using existing surveillance cameras connected to a reasonable powerful PC—the captured frames can be used to detect a single burst optical recognition event. User tracking throughout the mall could be either individually triggered based on the proximity to a store entrance or globally by sending out a signal through an existing network of Wi-Fi hotspots. In a mall scenario special offers could be pushed to user's devices when they are close or nearby a store entrance. The secure detection of an individual in front of the camera offer many advantages and opens new opportunities for advertisers or marketing concepts. One example would be an information point within a mall, it could be equipped with a TV screen that will display personalized offerings based on the person looking at the screen or standing in front of it.

Mobile Payment Scenario

There are many mobile payment systems available on the market, none of which managed to solve the core problem of identifying an individual in front of a point of sales counter. Mobile payment systems will only work when there is a reliable method to identify the individual doing the transaction. Single burst optical recognition delivers all of these needed functionalities. A user could enable in his online profile any payment provider he chooses and when he hits a terminal that is able to use our technology—the payment process will be automatically done. The suggested method offers many advantages to the shop owners, there is no investments in new hardware needed. Any mobile phone or tablet equipped with a camera will be sufficient to start processing payments for individuals walking into the store wearing our technology. By letting the user decide which payment provider he wants to use, we give peace of mind to the individual and offer the highest level of security and acceptance. Every transaction will automatically prevent fraud and it will make it easier for the individual to prove the transaction. Single burst optical recognition is an optical detection system that visually identifies an individual standing in front of a camera. This process mandates that a picture is taken and analysed—which means if the user is detected we get automatically proof of the person being at that position at a specific time. It's a system that offers security on all fronts. The shop owner can be sure he is dealing with the person in front of him that is detected (he just has to compare the profile picture, sent by our servers, with the person standing in front of him), and the individual wearing our technology can be sure that this system is not abused because for every detection incident a picture is taken of the person initiating the transaction. Single burst optical recognition offers the highest security possible for mobile transactions. On the back end all transactions created through our system (detecting the individual) are stored and recorded on our centralized server system. Shop owners can opt in to get paid through us or through their preferred payment provider. A system could be imagined were the user enables in his profile only a certain dollar amount, and the shop scanning the user at the point of sale will only get the information: payment approved or not. This would bear the benefit that no individual data will be transmitted to the shop owner. Privacy aware customers could opt for such a system.

Medical and Health Scenarios.

The identification of individuals within the health industry plays an important role in many ways. Single burst optical recognition can be used to identify individuals unable to communicate or express themselves. Alzheimer's patients for example, when confused could not state who they are or where they live. If such individuals would wear our technology, anyone with a mobile phone or smart device would be able to scan the person and find out all of the important information. In larger hospitals when shifts change—new personnel needs to get brought up to speed. By attaching a wearable device to patients, the identification and treatment or any other relevant information could be easily acquired right at the spot. Doctors and hospital personnel could wear our technology to ease access to certain areas within the hospital. Access to medicine or drugs could also be easily restricted through our system. An electronically locked medicine shelf with an integrated camera could easily detect the individual in front of it and release drugs based on the authorization level. Here, security would also be naturally automatic. Every incident (scan or detection of an individual) would automatically create a captured image of the detected person. All of those incidents will be stored in our centralized server for later review. It could be even imagined that healthcare cards or any form of identification to allow for health related treatments would be replaced by single burst optical recognition technology. The patient could be easily identified when he enters the hospital or clinic. All of the health history of the patient could be available in an encrypted form to be looked at by the Doctor.

Social Networking or Dating Scenario:

Social networks are more and more becoming part of everyone's daily life. The insatiable need to exchange and promote private information between individuals drives the technology and services available. Single burst optical recognition would add an additional component to the already existing technologies. By identifying the individual in a true mobile environment new software or applications will be possible. So called social networks for example (e.g. Facebook) could use our technology to offer new services for their customers. Linking or adding new contacts could be done on the go, instead of sitting inside an apartment in front of the PC and browsing the web. A possible scenario could be that a user attends a public event and meets new people not known to him but still he can get all their background information by using a simple smart phone App that will tell him who is standing in front of him. They will be able to track when and who is meeting where. This will open up a whole new opportunities to monetize social networking.

Public Transportation Scenario:

Public transport would benefit from single burst optical recognition. Payment for using a bus or train could be completely automated. Wearing our technology would be automatically identified when entering a bus or train—just with the help of a camera and software. Based on their payment plan, the user will be allowed to just sit down and to use the bus or transportation system or they would be automatically charged for using the transportation system (ferry). In addition a system could be imagined that will automatically identify cars or vehicles crossing a toll bridge. The principle of single burst optical recognition would always stay the same, our technology would be placed or stuck onto a car and this will be optically identified when crossing the bridge or entering any other form of toll-able transportation.

Computer Games and Augmented Reality Scenarios:

Augmented reality especially within computer games is a topic of interest in the industry. Single burst optical recognition solves one important technical problem when implementing proper augmented reality application. Multi-player games for example need an important ingredient to function—the individuals taking part in the game. Our technology enables developers to create a new breed of games allowing for a true mobile gaming experience. Total strangers meeting at an Airport, for example, could easily identify other players or join an existing game right at the spot. Mobile games could be created that are aware of their environment. Objects or places could be installed with our technology and this information could be used to create a game. A lamp post within a city, for example, could have our device installed (glued on) when scanning this device any kind of information could be displayed. By using optical recognition the detected area within the video frame could be used to augment any information or modify the existing object. Here, again the optical recognition plays to its full advantage over any other method of identifying an object or individual.

Distinguishing Characteristics:

Our optical "detection" method is based on differential images taken with the camera (scanning device). An exactly timed coherent chain of commands is sent out to the SBOR device (TAG) that makes the device blink at a predictable time. Hence we have the huge advantage of just comparing 2 pictures instead of analyzing a live video stream of 60 frames per second in HD. The workload reduction on the processor (device) side is multiple magnitudes less. We only need to take two pictures (one with the blink one without). We do not need to analyse a video stream and search for hidden information in it.

We use a unique ID of the device itself (right now we use the bluetooth MAC address) to identify who the registered user of that device is.

To solve a multiple TAG scenario (more than one device in visible range), we use a serialized scanning approach—based on the nearest device which is asked to blink first then the second closest and so forth.

To avoid overexposure or white out effects in the captured image, we use the distance (signal strength) between TAG and the scanning device (mobile phone) the SBOR TAG will automatically adjust its luminous output power based on the distance and possibly other device parameters like camera and surrounding illumination. The scanner device will in that case transmit the average illumination it sees (through its camera) this normalized value created by the scanner device will be used by the SBOR TAG to adjusts its power used for the LED to flash (blink). This will avoid, for example, in dark environments that the blink of the SBOR TAG LED burns out the captured image and renders the image useless for spot detection. The same advantage will come out of this system for bright environments.

We decide on the distance or how close a device is based on the signal strength of the bluetooth device. The signal strength of the bluetooth connection between scanner (the camera device) and the TAG gives us a very good estimate of the distance to the scanner device.

To solve a multiple scanner scenario, we use the channel option of the bluetooth communication protocol. Multiple connections to devices can be achieved on separate channels.

The SBOR system is an active TAG system it is powered by a battery and uses modern power saving technologies, but it is always on and transmits information. TAGS will respond instantly without user interactions.

Variations

All references to bluetooth are made just because it was not practical to develop our own transmission technology when there was transmission technology available that could be readily adapted. We can use any radio transmitted data system similar to Bluetooth. The operation of the invention does NOT rely on any specific radio transmitter technology. The only thing needed to transmit from and SBOR TAG to scanner is an ID, and some extended data like signal strength (to measure distance) or orientation of the TAG.

The blink (Single Light Burst) can be created by a multitude of technologies including Infrared, UV LEDs or visible light OLEDs.

We do not really care about the exact method of the image processing as there might be and will be many more better methods coming. But in general we do a differential image detection method. We then find the Blink LED in the "on" image of the 2 captures. The Blink position is flagged and the x,y position is output. It is also possible to perform a 3D extrapolation of the position of the SBOR TAG. With the absolute known position of the scanner device, orientation and pitch and the camera parameters like FOV and distortion we can calculate the 3D position of the SBOR TAG (person wearing it). The distance between TAG and scanner device will come from the signal strength. Now, we have all variables to properly calculate the 3D position of the TAG in relation to the scanner device.

The detection system can be greatly enhanced by using special purpose physical filters for the scanner device (camera). If desired, a special purpose LED could be created to emit a NARROW band (preferably single frequency) of Infrared (<700 nm). This narrow band LED light emitter could be matched exactly to a camera filter so that, for example, the camera will only see the exact frequency of the electromagnetic spectrum the LED emits. This will practically render the captured image black unless the TAG is activated. This hardware approach will make the image processing even more robust and simpler.

It is not essential that there be a special TAG (extra wearable device). The SBOR TAG is practically just a light emitter "on call". We can reproduce this behavior with any kind of light emitting device including the screen of a cell phone. This would render the need of an extra TAG device obsolete. Any light emitting device that can process commands can be a SBOR device. For example, modern mobile phone screens we can actually simulate the blink of a LED). It might not be as comfortable and simple as having a dedicated device however it comes with the advantage of not needing an extra wearable device.

However, the idea about the SBOR tag as an extra device is that you can integrate its technology in any kind of wearable device like a watch for example. Also having 2 devices could give us the extra security of a two factor authentication where an attacker would have to steal 2 devices at the same time to impersonate the person through SBOR authentication.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A method of mobile optical recognition, comprising:
    equipping authorized parties with a signalling device capable of generating a light spectrum signal;
    sending from a mobile device having a scanner a signal interrogating the signalling device;
    capturing with the scanner an image of a generated light spectrum signal generated by the signalling device in response to interrogation by the mobile device by capturing, in close temporal relation, a first image taken immediately prior to the generated light spectrum signal and then a second image with the generated light spectrum signal; and comparing the generated light spectrum signal with an anticipated light spectrum signal stored in a database to verify authenticity.

2. The method of claim 1, wherein a further step is taken of using differential imaging between the first image and the second image to differentiate the generated light spectrum signal from other light.

3. The method of claim 1, wherein the light spectrum signal is a single burst or blink of light.

4. The method of claim 1, wherein the signalling device is a single burst optical recognition tag (SBOR-TAG) coupled with a light source, the SBOR-TAG having a unique identifier.

5. The method of claim 4, wherein the SBOR-TAG communicates using Bluetooth technology.

6. The method of claim 1, wherein in the presence of more than one signalling device in visible range, serialized scanning is triggered with a closest signalling device interrogated first, then a second closest signalling device interrogated next and so forth.

7. The method of claim 1, wherein, to avoid overexposure or white out effects in a captured image, the signalling device will automatically adjust its luminous output power based on a distance to the scanner.

8. The method of claim 7, wherein the distance between the signalling device and the scanner is determined by signal strength, 9. The method of claim 1, wherein the scanner has a filter so that the scanner will only see a frequency range of light spectrum signal emitted by the signalling device.

10. The method of claim 1, wherein the signalling device is a wearable device.

11. The method of claim 10, wherein there are two wearable signalling devices, both of which must be interrogated to provide authentication.

\* \* \* \* \*